US007712394B2

(12) United States Patent
Wu

(10) Patent No.: US 7,712,394 B2
(45) Date of Patent: May 11, 2010

(54) HANDLEBAR GRIP

(75) Inventor: Kuo-Lin Wu, Taichung Hsien (TW)

(73) Assignee: International Bicycle Products Corporation, Taichung Hsien (TW)

( * ) Notice: Subject to any disclaimer, the term of this patent is extended or adjusted under 35 U.S.C. 154(b) by 143 days.

(21) Appl. No.: 11/755,413

(22) Filed: May 30, 2007

(65) Prior Publication Data
US 2008/0196540 A1 Aug. 21, 2008

(30) Foreign Application Priority Data
Feb. 16, 2007 (TW) .............................. 96203236 U

(51) Int. Cl.
B62K 21/26 (2006.01)
(52) U.S. Cl. .................... 74/551.9; 16/421; 403/338
(58) Field of Classification Search ................. 74/512; 16/421; 403/289, 290, 338, 344
See application file for complete search history.

(56) References Cited
U.S. PATENT DOCUMENTS
5,356,237 A * 10/1994 Sung ..................... 403/374.3
5,356,267 A * 10/1994 Fulmer ..................... 417/53
2004/0068844 A1* 4/2004 Lumpkin ................. 16/421

FOREIGN PATENT DOCUMENTS
TW M267157 6/2005

* cited by examiner

Primary Examiner—Richard W L Ridley
Assistant Examiner—Thomas Diaz
(74) Attorney, Agent, or Firm—Browdy and Neimark, PLLC

(57) ABSTRACT

A handlebar grip for a transportation vehicle includes a grip body having a body portion and an annular flange provided on one end of the body portion, a tightening member mounted on the outer surface of the annular flange, a locating ring mounted on the outer surface of the annular flange in such a way that the tightening member is placed in between the locating ring and the annular flange, and a fastener inserted into a through hole of the locating ring. When the fastener is fastened up, one end of the fastener leans against the outer surface of the tightening member such that the annular flange of the grip body is pressed by the tightening member to be radially inwardly deformed and compressed against the periphery of a handlebar of the transportation vehicle. Thus, the handlebar grip is firmly fixed to the handlebar of the transportation vehicle.

7 Claims, 5 Drawing Sheets

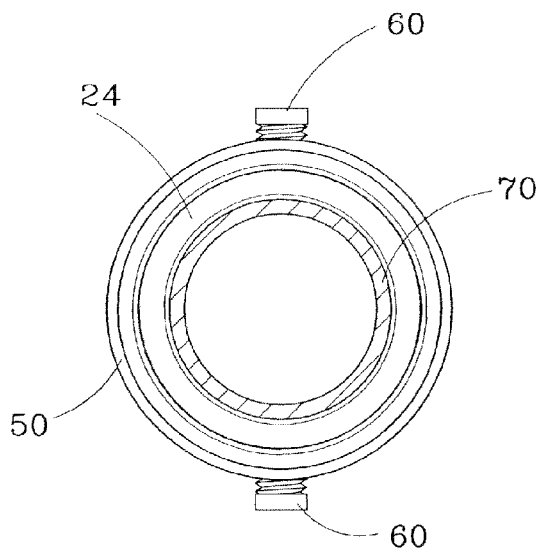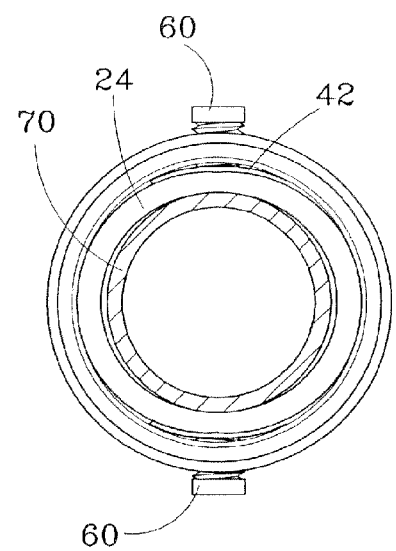
FIG. 3　　　　　　　FIG. 4
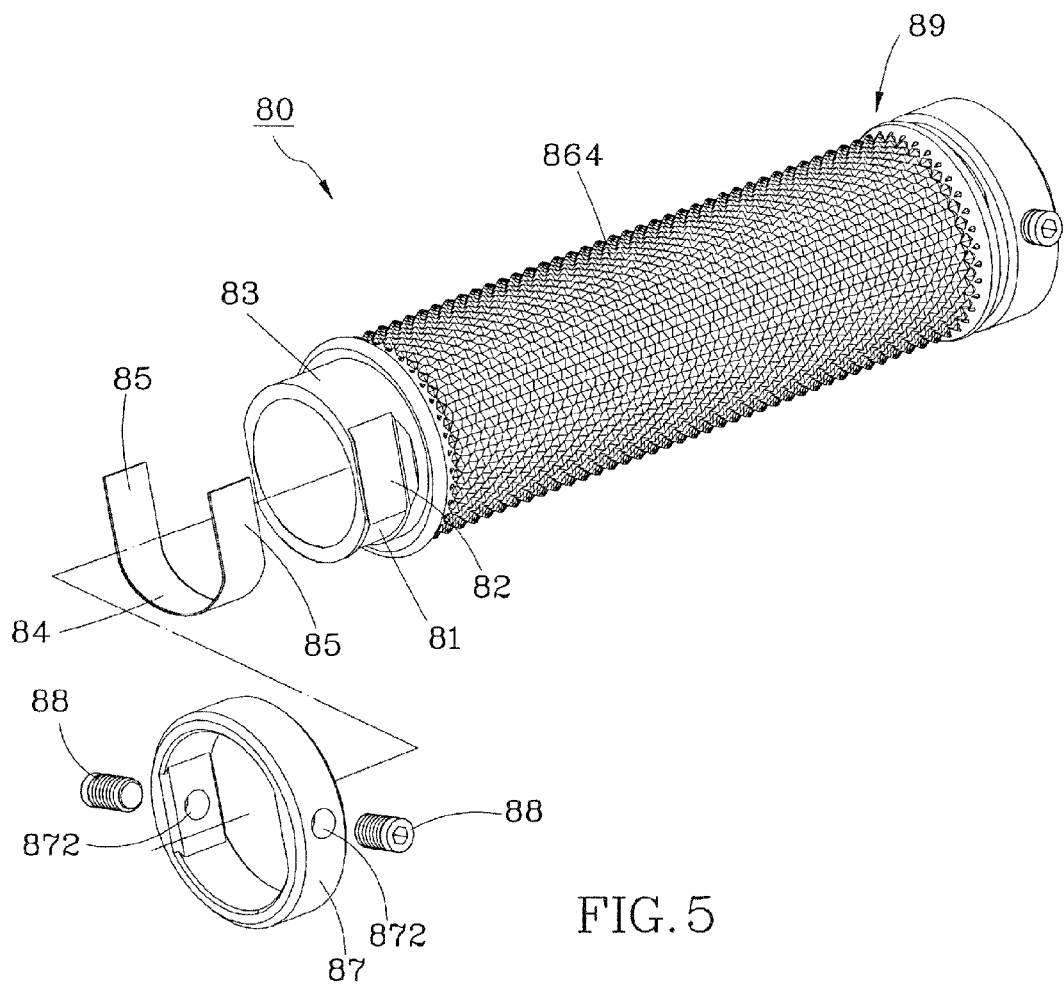
FIG. 5

HANDLEBAR GRIP

BACKGROUND OF THE INVENTION

1. Field of the Invention

The present invention relates generally to a handlebar grip and more specifically, to a handlebar grip for a transportation vehicle, for example, a bicycle, motorcycle or tricycle.

2. Description of the Related Art

Taiwan Patent No. M267157 discloses a handlebar grip for a transportation vehicle including a grip body, a locating ring, a screw and a tightening member. The grip body is provided at one end thereof with an insertion groove for insertion of the locating ring and a through hole in communication with the insertion groove. The locating ring is provided with a center hole surrounded by an inner surface thereof and a threaded hole passed through the inner and outer surfaces thereof. The screw is inserted into the through hole of the grip body and threaded into the threaded hole of the locating ring. The tightening member is mounted in the inner surface of the locating ring. When the screw is screwed up, a bottom end of the screw leans against the outer surface of the tightening member such that the inner surface of the tightening member is compressed against the periphery of the handlebar of the transportation vehicle, thereby firmly fixing the handlebar grip to the handlebar of the transportation vehicle.

According to this design, both of the tightening member and the handlebar of the transportation vehicle are made of metals. When the handlebar grip and the handlebar are assembled, the constant friction between the tightening member and the handlebar will cause the inner surface of the tightening member and the periphery of the handlebar to damage, resulting in that the handlebar grip may not be securely fixed to the handlebar of the transportation vehicle. Therefore, it is a need to provide an improved handlebar grip.

SUMMARY OF THE INVENTION

The present invention has been accomplished in view of the above-noted circumstances. It is therefore one objective of the present invention to provide a handlebar grip for a transportation vehicle, which doesn't cause damage to the periphery of a handlebar of the transportation vehicle.

It is therefore another objective of the present invention to provide a handlebar grip for a transportation vehicle, which is securely fastened to a handlebar of the transportation vehicle.

To achieve these objectives of the present invention, the handlebar grip comprises a grip body, a tightening member, a locating ring and a fastener. The grip body has a body portion and an annular flange provided on one end of the body portion. The tightening member is mounted on an outer surface of the annular flange of the grip body. The locating ring is mounted on the outer surface of the annular flange of the grip body in such a way that the tightening member is placed in between the locating ring and the annular flange of the grip body. The fastener is inserted into a through hole of the locating ring in such a way that one end of the fastener leans against an outer surface of the tightening member to press the annular flange of the grip body to be radially inwardly deformed and compressed against the periphery of a handlebar of a transportation vehicle that is inserted into the grip body. Therefore, the handlebar grip is firmly fixed to the handlebar of the transportation vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein:

FIG. 3 is an end view of the first embodiment of the present invention;

FIG. 4 is similar to FIG. 3 but showing the annular flange compressed;

FIG. 5 is an exploded view of a second embodiment of the present invention;

DETAILED DESCRIPTION OF THE INVENTION

Figure 1:
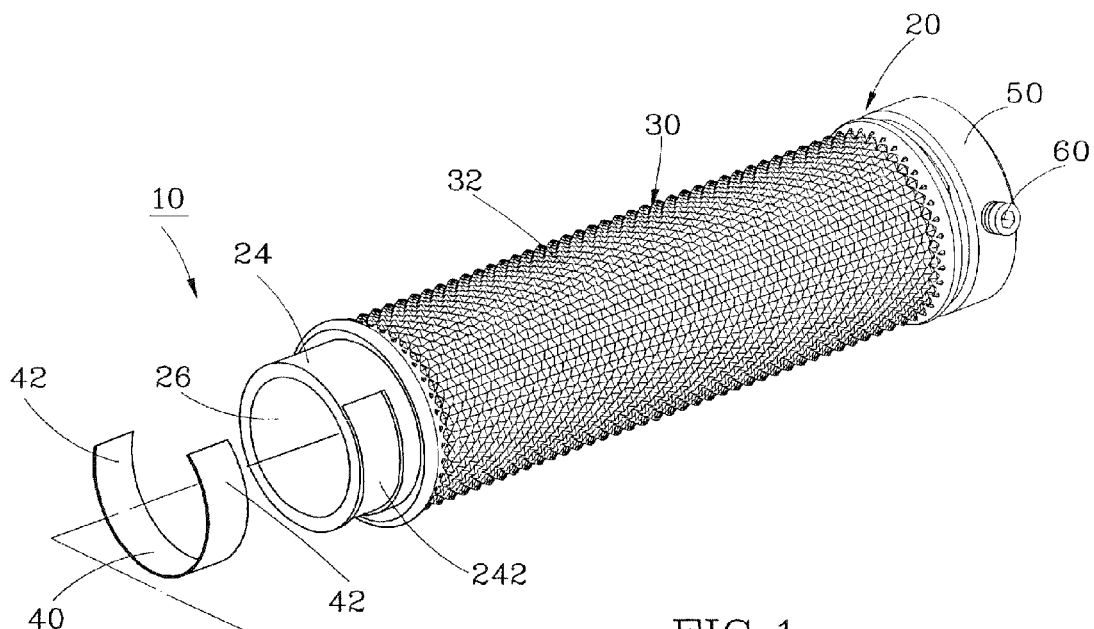
FIG. 1 is an exploded view of a first embodiment of the present invention.

As shown in FIG. 1, a handlebar grip 10 for a transportation vehicle in accordance with a first embodiment of the present invention comprises a grip body 20, an outer layer 30, two tightening members 40, two locating rings 50 and four fasteners 60.

Figure 2:
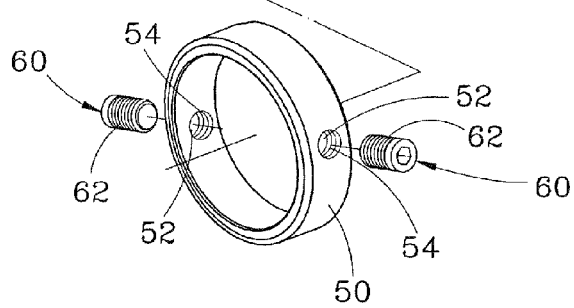
FIG. 2 is a perspective view of a grip body of the first embodiment of the present invention.
Figure 2:
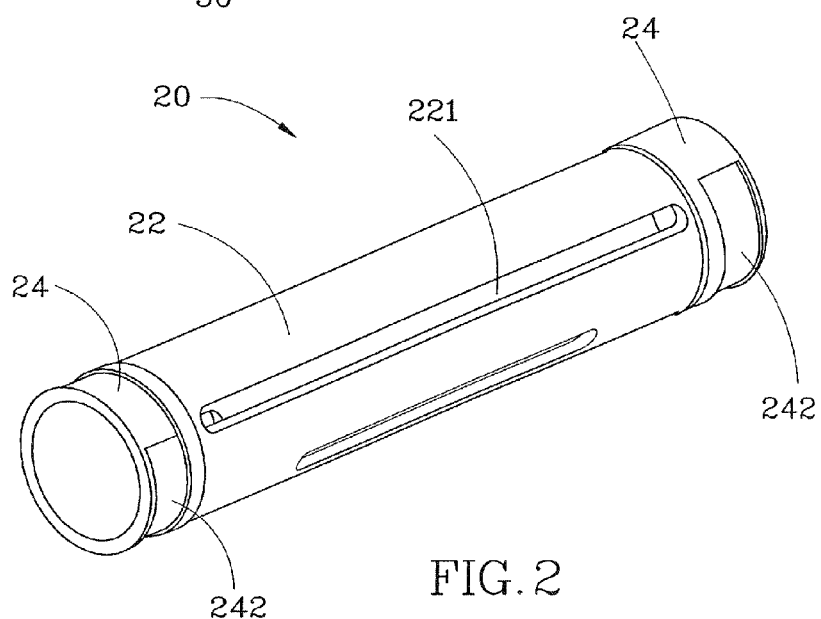

Referring to FIG. 2, the grip body 20 is injection-molded from plastics, comprising a body portion 22 having a plurality of elongated slots 221 equiangularly spaced around a periphery thereof and extending along the longitudinal axis thereof from the front end to the rear end thereof, two annular flanges 24 respectively provided on the front and rear ends of the body portion 22 and provided at an outer surface thereof with a C-shaped receiving portion 242, and a center through hole 26 for insertion of a handlebar of the transportation vehicle.

The outer layer 30 is made of rubber and covered on the outer surface of the body portion 22 of the grip body 20. Because of the presence of the elongated slots 221, the outer layer 30 will be gripped flexibly when it is gripped by the hand of a rider. Further, recessed lines 32 are formed on the surface of the outer layer 30 to cause a sense of beauty and increase the friction force upon gripping by the hand of the rider.

The tightening members 40 are made of metals and C-shaped. Each tightening member 40 is accommodated at the receiving portion 242 of the annular flange 24 of the grip body 20.

The locating rings 50 are sleeved onto the outer surface of the annular flanges 24 of the grip body 20 in such a way that the tightening member 40 is placed in between the locating ring 50 and the annular flange 24 of the grip body 20. The locating rings 50 each have two through holes 52, each of which is passed through the inner and outer surfaces of the respective locating ring 50 and has inner threads 54 disposed in the inside wall thereof. Each of the through holes 50 is aimed at an end portion 42 of the tightening member 40.

The fasteners 60 each have outer threads 62 engaging the inner threads 54 of the through holes 52 of the locating rings 50 in such a way that a bottom end of the fastener 60 can be protruded out of the through holes 52 of the locating rings 50 to lean against an outer surface of the end portion 42 of the tightening member 40, as shown in FIG. 4.

During installation of the handlebar grip 10 in the handlebar 70 of the transportation vehicle (bicycle or motorcycle), the fasteners 60 are loosened such that the bottom ends of the fasteners 60 don't lean against the outer surfaces of the end portions 42 of the tightening members 40. Thus, the handlebar grip 10 can easily be sleeved onto the handlebar 70 of the transportation vehicle through the center through hole 26 until the outer end of the locating ring 50 is flush with the outer end of the handlebar 70, and then the fasteners 60 are fastened tight by a hand tool. At this time, as shown in FIG. 4, the bottom ends of the fasteners 60 are protruded out of the through holes 52 of the locating rings 50 and leans against the outer surfaces of the end portions 42 of the tightening members 40 such that the annular flanges 24 of the grip body 20 are pressed by the tightening members 40 to be radially inwardly deformed and compressed against the periphery of the handlebar 70 of the transportation vehicle, thereby firmly fixing the handlebar grip 10 to the handlebar 70 of the transportation vehicle.

As indicated above, the present invention provides a handlebar grip that can be securely fixed to the handlebar of the transportation vehicle. Furthermore, because the grip body is made of plastics, the annular flange of the grip body won't cause damage to the periphery of the handlebar of the transportation vehicle when they are assembled.

Figure 6:
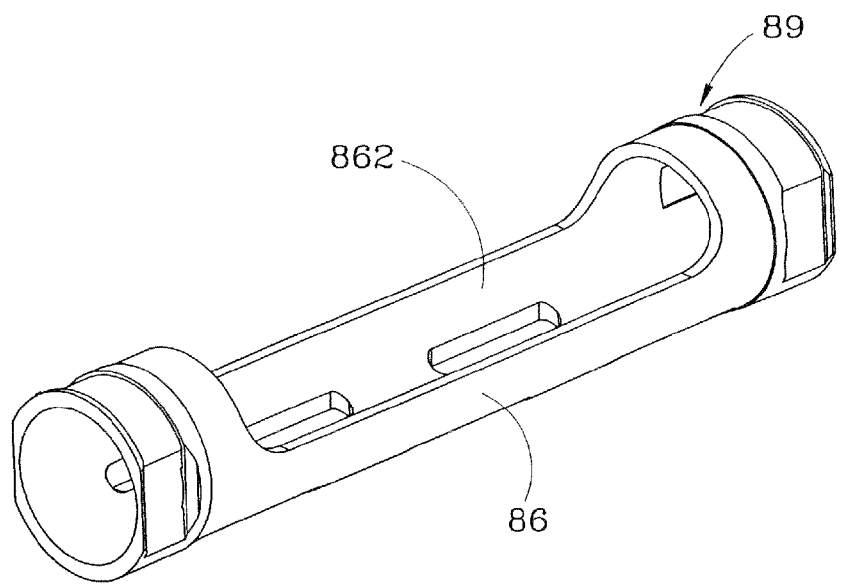
FIG. 6 is a perspective view of a grip body of the second embodiment of the present invention.

Referring to FIG. 5, a handlebar grip 80 constructed in accordance with a second embodiment of the present invention is similar to the handlebar grip 10 of the first embodiment of the present invention with the exception that the tightening member 84 has two first flat ends 85 respectively corresponding to the through holes 872 of the locating ring 87 and the receiving portion 81 of the annular flange 83 of the grip body 89 has two second flat ends 82 to receive the first flat ends 85 of the tightening member 84 such that the thickness of the second flat ends 82 of the annular flange 83 of the grip body 89 are smaller than that of other parts of the annular flange 83 of the grip body 89. Further, as shown in FIG. 6, the body portion 86 of the grip body 89 has a hollow portion 862 to be covered with the outer layer 864 for gripping flexibly by the hand of the rider.

Figures 7, 8:
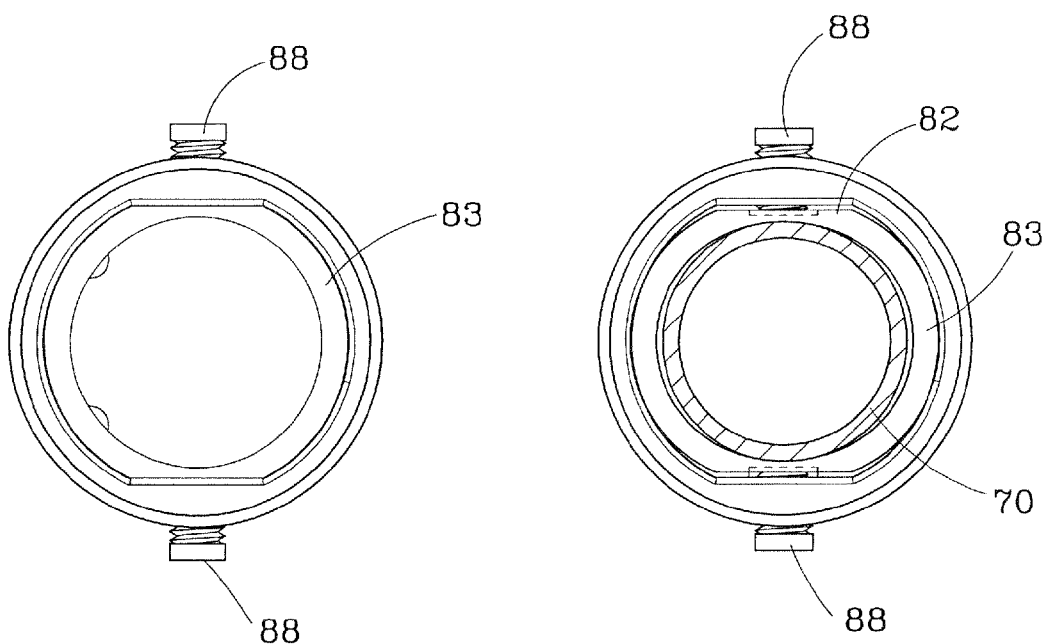
FIG. 7 is an end view of the second embodiment of the present invention.
FIG. 8 is similar to FIG. 7 but showing the annular flange compressed.

When the fasteners 88 are fastened up, as shown in FIG. 7 and FIG. 8, the first flat ends 85 of the tightening member 84 are pressed by the fasteners 88 to lean against the second flat ends 82 of the receiving portion 81 of the annular flange 83, thereby fixing the handlebar grip 80 to the handlebar.

Figure 9:
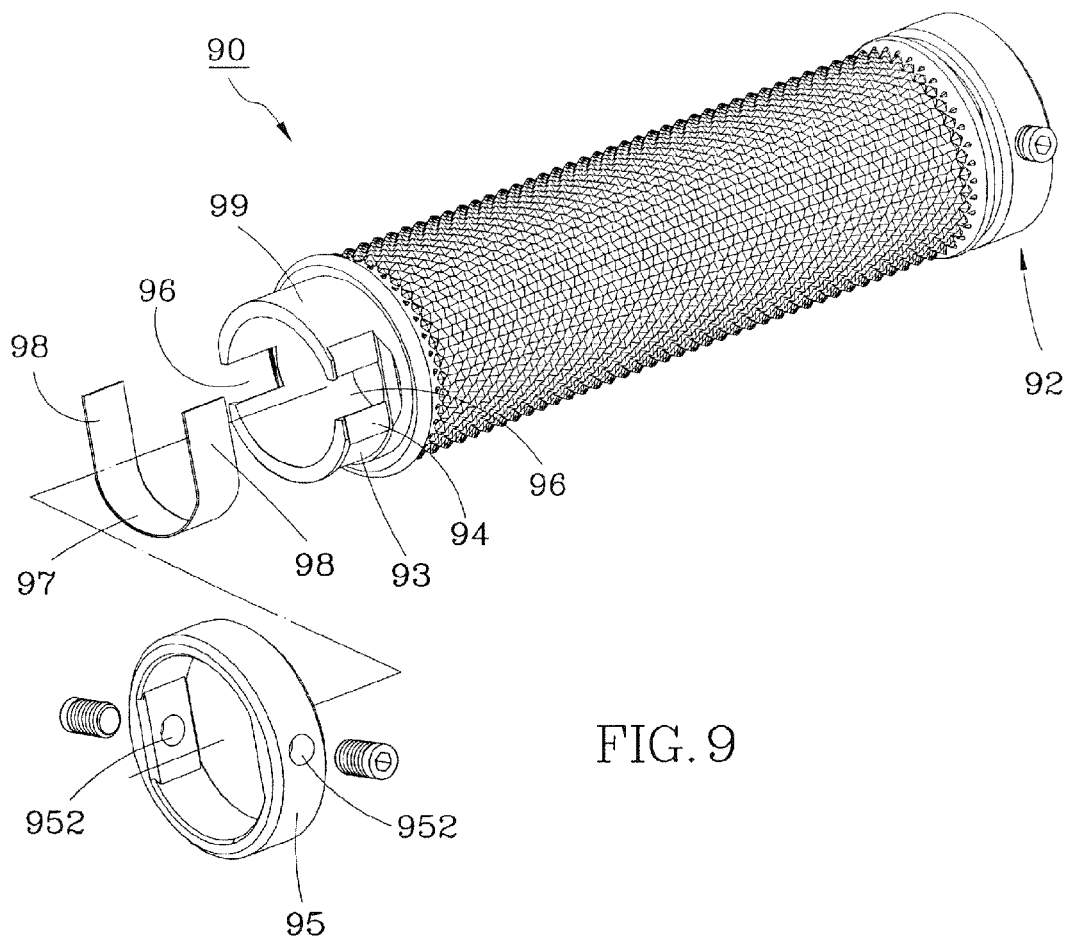
FIG. 9 is an exploded view of a third embodiment of the present invention.
Figure 10:
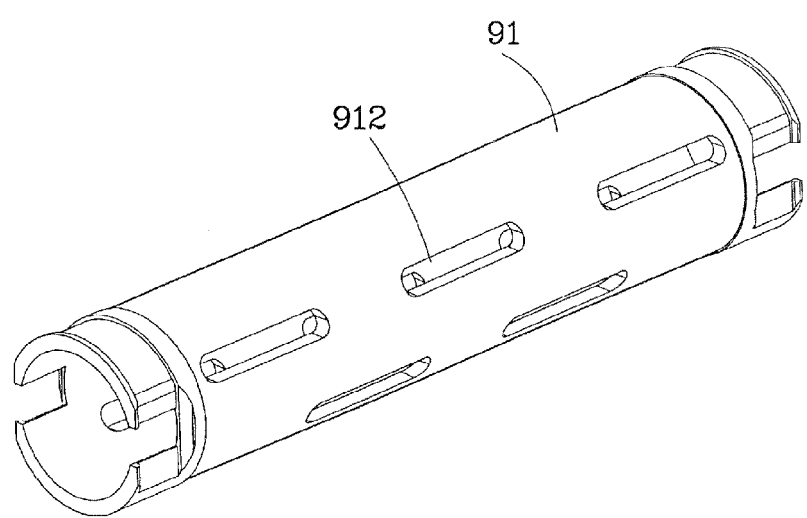
FIG. 10 is a perspective view of a grip body of the third embodiment of the present invention.
Figure 11:
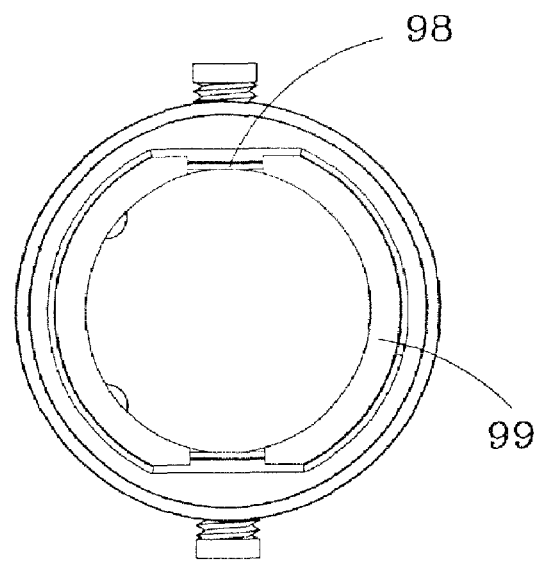
FIG. 11 is an end view of the third embodiment of the present invention.
Figure 12:
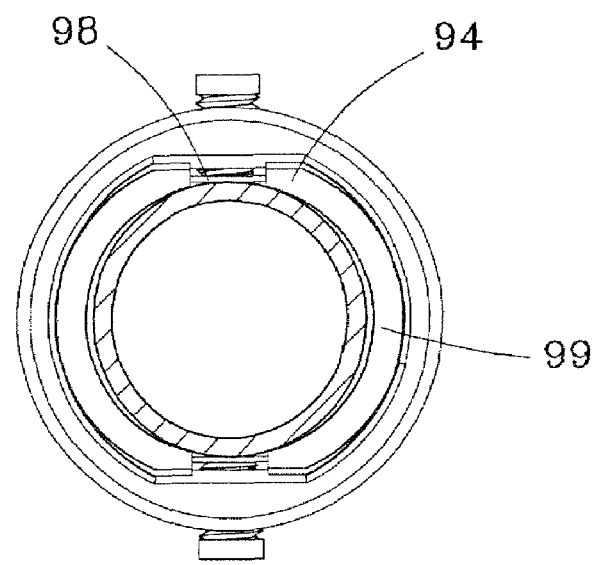
FIG. 12 is similar to FIG. 11 but showing the annular flange compressed.

Referring to FIG. 9, a handlebar grip 90 constructed in accordance with a third embodiment of the present invention is similar to the two above-mentioned embodiments of the present invention, except that the length of the elongated slots 912 of the body portion 91 of the grip body 92 are shorter than that of the elongated slots 212 of the first embodiment of the present invention, as shown in FIG. 10. Besides, the annular flanges 99 of the grip body 92 are provided with two crevices 96 at the two second flat ends 94 of the receiving portion 93 thereof. The crevices 96 are respectively aimed at the through holes 952 of the locating ring 95 and covered with the first flat ends 98 of the tightening member 97. Consequently, as shown FIG. 11 and FIG. 12, when the first flat ends 98 of the tightening member 97 lean against the second flat ends 94 of the receiving portion 93 of the annular flange 99 of the grip body 92, the annular flanges 99 will be deformed more because of the crevices 96, thereby achieving the objective of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A handlebar grip comprising:
   a grip body having a body portion and an annular flange provided on one end of the body portion;
   a tightening member mounted on an outer surface of the annular flange of the grip body;
   a locating ring mounted on the outer surface of the annular flange of the grip body in such a way that the tightening member is placed in between the locating ring and the annular flange of the grip body, the locating ring having a through hole through outer and inner surfaces thereof; and
   a fastener inserted into the through hole of the locating ring in such a way that one end of the fastener leans against the outer surface of the tightening member to press the annular flange of the grip body to be radially and inwardly deformed;
   wherein the annular flange of the grip includes a receiving portion provided on the outer surface thereof for receiving the tightening member,
   wherein the tightening member is C-shaped,
   wherein the tightening member has a first flat end corresponding to the through hole of the locating ring, and
   wherein the receiving portion of the annular flange of the grip body has a second flat end to receive the first flat end of the tightening member.

2. The handlebar grip as claimed in claim 1, wherein the thickness of the second flat end of the receiving portion of the annular flange of the grip body is smaller than that of other parts of the annular flange of the grip body.

3. The handlebar grip as claimed in claim 1, wherein the receiving portion of the annular flange of the grip body has a crevice corresponding to the through hole of the locating ring.

4. The handlebar grip as claimed in claim 1, wherein the body portion of the grip body has a plurality of elongated slots.

5. The handlebar grip as claimed in claim 1, wherein the body portion of the grip body has a hollow portion.

6. The handlebar grip as claimed in claim 1, further comprising an outer layer covering on an outer surface of the body portion of the grip body.

7. The handlebar grip as claimed in claim 1 wherein the through hole of the locating ring is internally threaded, and the fastener is a threaded member threadably engaging with the thread of the through hole to extend radially into pressing engagement with the tightening member.

* * * * *